US012606024B2

(12) United States Patent
Hertzberg

(10) Patent No.: US 12,606,024 B2
(45) Date of Patent: Apr. 21, 2026

(54) POWER SUPPLY SYSTEM FOR AN ELECTRIC VEHICLE AND A CARGO BOX

(71) Applicant: DIPP-R AB, Lomma (SE)

(72) Inventor: Conny Hertzberg, Lomma (SE)

(73) Assignee: DIPP-R AB, Lomma (SE)

( * ) Notice: Subject to any disclaimer, the term of this patent is extended or adjusted under 35 U.S.C. 154(b) by 626 days.

(21) Appl. No.: 17/921,704

(22) PCT Filed: Apr. 29, 2021

(86) PCT No.: PCT/EP2021/061311
§ 371 (c)(1),
(2) Date: Oct. 27, 2022

(87) PCT Pub. No.: WO2021/219809
PCT Pub. Date: Nov. 4, 2021

(65) Prior Publication Data
US 2023/0166599 A1 Jun. 1, 2023

(30) Foreign Application Priority Data

Apr. 30, 2020 (EP) .................................... 20172495

(51) Int. Cl.
*B60L 1/00* (2006.01)
*B60H 1/00* (2006.01)
(Continued)

(52) U.S. Cl.
CPC .......... *B60L 1/003* (2013.01); *B60H 1/00428* (2013.01); *B60H 1/3232* (2013.01); *B60L 53/14* (2019.02)

(58) Field of Classification Search
CPC .. B60K 1/04; B60K 1/02; B60L 1/003; B60L 53/14; B60H 1/00428; Y02T 10/7072
See application file for complete search history.

(56) References Cited

U.S. PATENT DOCUMENTS 2,760,784 A 8/1956 Talbert et al.
3,749,363 A 7/1973 Hauser
(Continued)

FOREIGN PATENT DOCUMENTS

CN 110171350 8/2019
EP 0496309 7/1992
(Continued)

OTHER PUBLICATIONS

Classic Combines Low Loader, www.classic-combines.com/lowloader, Jun. 2020, 2 pages.
(Continued)

*Primary Examiner* — Jason D Shanske
*Assistant Examiner* — James J Triggs
(74) *Attorney, Agent, or Firm* — Dinsmore & Shohl LLP

(57) ABSTRACT

An electric vehicle power supply system and cargo box includes an electric vehicle assembly, for location on the vehicle. The assembly includes a drivetrain, vehicle electric arrangements, including a low voltage arrangement having a vehicle system battery, for powering vehicle electric systems, and a vehicle first converter, converting power from traction battery pack to vehicle system battery. The assembly includes traction battery pack, for powering the electric arrangements and drivetrain. A cargo box assembly includes cargo box electric arrangements, including a low voltage arrangement with cargo box system battery, for powering box electric systems, and a cargo box first converter, converting power from box battery pack to cargo box system battery. The box assembly includes cargo box battery pack, for powering the box electric arrangements and traction battery pack, and a cargo box second converter for converting power from a charging system to the cargo box battery pack.

20 Claims, 5 Drawing Sheets

(51) Int. Cl.
    *B60H 1/32*         (2006.01)
    *B60L 53/14*         (2019.01)

(56)            References Cited

U.S. PATENT DOCUMENTS

| | | | |
|---|---|---|---|
| 5,007,793 | A | 4/1991 | Irvin |
| 9,004,454 | B1 | 4/2015 | Faure et al. |
| 2017/0253166 | A1 | 9/2017 | Rezvanian |
| 2018/0105063 | A1 | 4/2018 | Wei et al. |
| 2018/0312098 | A1 | 11/2018 | Marmur et al. |

FOREIGN PATENT DOCUMENTS

| | | | |
|---|---|---|---|
| EP | 2463138 | 6/2012 | |
| JP | 2018181803 | 11/2018 | |
| JP | 2018182803 | 11/2018 | |
| KR | 20180020666 | 2/2018 | |
| WO | 2004085198 | 10/2004 | |
| WO | 10048713 | 5/2010 | |
| WO | 2015/106336 | 7/2015 | |
| WO | 2018041484 | 3/2018 | |
| WO | 2018/073392 | 4/2018 | |
| WO | 19014325 | 1/2019 | |
| WO | 2020/068446 | 4/2020 | |
| WO | 2020/068637 | 4/2020 | |
| WO | 2020/068641 | 4/2020 | |
| WO | 2020/068646 | 4/2020 | |
| WO | 2020/069107 | 4/2020 | |
| WO | WO-2020068637 A1 * | 4/2020 | ......... B60H 1/00428 |

OTHER PUBLICATIONS

Straddle Carrier 101, Gerlinger Carrier, https://gerlingercarrier.com, Jun. 2020, 3 pages.

\* cited by examiner

POWER SUPPLY SYSTEM FOR AN ELECTRIC VEHICLE AND A CARGO BOX

CROSS-REFERENCE TO RELATED APPLICATIONS

This application is the U.S. National Stage of PCT/EP2021/061311 filed on Apr. 29, 2021, which claims priority to European Patent Application 20172495.2 filed on Apr. 30, 2020, the entire content of both are incorporated herein by reference in their entirety.

FIELD OF THE INVENTION

The present disclosure relates to a power supply system for an electric vehicle and a cargo box, and a cargo transport vehicle assembly comprising a power supply system.

BACKGROUND OF THE INVENTION

Transportation of goods is a cornerstone of our society, wherein goods are transported in several segments as parts of a logistics chain, such as between a point of manufacturing and warehouse/cross-docking terminal and between a warehouse/cross-docking terminal and a point of consumption or pick-up point.

Goods may be transported via a multitude of modalities including marine, air, road and rail, wherein the different modalities may be more suitable for being used in specific segments of the logistics chain. In general, when closer to a consumer transportation of goods by road is more common, for example by a delivery vehicle.

A significant factor which decreases the efficiency of transportation of goods, and thereby increasing the overall costs of the operations, is the non-serviceable hours of a cargo vehicle, i.e. the amount of time where the cargo vehicle is not in service, and furthermore the deadhead, i.e. the amount of time where the cargo vehicle operates without cargo.

The non-serviceable hours for an electric cargo vehicle may be due to, for example, being recharged or for loading and unloading the cargo, while deadhead may be due to inefficient planning of the route schedule of the delivery vehicle As cargo vehicles typically require a significant monetary investment while it has a finite service life, a satisfactory return of investment can typically only be achieved when the non-serviceable hours and deadheading is minimized.

Several strategies are used for increasing the efficiency of transportation of cargo, including online marketplaces wherein for example carriers and shippers provide and request services, ensuring that market mechanisms act to increase the efficiency. A carrier or shipper may thereby plan the route of a cargo vehicle such that the deadhead is minimized, acting to increase the revenue for that particular vehicle.

Autonomous cargo vehicles may further increase the serviceable hours without driving cost, as there are no labour costs involved for operating the vehicle. However, the non-serviceable hours of an electric delivery vehicle due to recharging and unloading/unloading of cargo, still remains a major factor limiting the return of investment of a delivery vehicle.

The charging time for a delivery vehicle depends on the battery capacity and the charging power. As an example, for a 60 kWh battery in combination with a modern home charging station with a maximum capacity of 20 kW, the time required to charge the battery from empty-to-full may be 7 hours. Various fast charging systems exist that are able to supply higher charging powers, on the order of a 100 kW, resulting in a total charging time of a few hours. While the charging time is decreased, it may still be a significant contributing factor to the non-serviceable hours of a delivery vehicle, together with the time for loading/unloading of the delivery vehicle. Additionally, new electric power infrastructures are associated with significant costs.

SUMMARY OF THE INVENTION

The present inventors have realized how a logistics system can be structured such that the serviceable hours of a cargo vehicle is significantly increased.

The present disclosure relates to, according to a first embodiment, A power supply system for an electric vehicle and a cargo box, comprising:

a. an electric vehicle assembly, for being located on the electric vehicle, comprising:
   i. a drivetrain;
   ii. a number of vehicle electric arrangements, including a low voltage arrangement comprising:
      1. a vehicle system battery, for powering one or more vehicle electric systems; and
      2. a vehicle first converter, for converting power from the traction battery pack to the vehicle system battery; and
   iii. a traction battery pack, for powering the electric arrangements and the drivetrain of the electric vehicle;

b. a cargo box assembly, for being located on the cargo box, comprising:
   i. a number of cargo box electric arrangements, including a low voltage arrangement comprising:
      1. a cargo box system battery, for powering one or more cargo box electric systems; and
      2. a cargo box first converter, for converting power from the cargo box battery pack to the cargo box system battery;
   ii. a cargo box battery pack, for powering the cargo box electric arrangements and the traction battery pack; and
   iii. a cargo box second converter for converting power from a charging station to the cargo box battery pack.

By the use of a battery pack located in a cargo box, the cargo box can be recharged while waiting for being picked-up. Following pick up, the cargo box battery pack may supply power to the electric vehicle. Thereby, the electric vehicle does not require stopping for recharging its batteries. A logistics system relying on electric vehicles receiving a charge from cargo boxes, can have a very high number of serviceable hours. In principle, an autonomous electric vehicle designed in such a way, may have uninterrupted service.

The power supply system may thereby enable a logistics system relying on a cargo box battery pack for providing a charge to the electric vehicle. The cargo box battery pack may thereby provide a charge for propelling the vehicle from a pick-up point to a drop-off point.

The electric vehicle preferably comprises means for loading and unloading the cargo box, and may for example be a U-shaped vehicle with a rearward open frame, as described in EP0496309 A1. The vehicle may thereby be adapted to move backwards until the cargo box is situated within the shanks of said U-shaped frame, such that the cargo box can be lifted off the ground, for transportation thereof after lifting. However, the electric vehicle may also be another type of vehicle, such as a bike, for example a cargo bike, for transporting the cargo box.

When the cargo box is dropped off, at the drop-off point, the electric vehicle may pick up a second cargo box, comprising a cargo box battery pack. Said second cargo box has preferably been charged at the pick-up/drop off point, and may thereby supply the electric vehicle with power, following pick-up.

Alternatively, when no cargo box is connected to the electric vehicle, the electric vehicle may be powered by a battery located on the electric vehicle, (e.g. a traction battery pack), for providing a charge to propel the electric vehicle to a second pick-up point.

The traction battery pack may be made significantly smaller and lighter than the main battery pack. Fully adopted, this logistics and transportation system may enable continuous operation where the vehicle never has to stop for charging, and in extension, an automated logistics and transportation system for fully autonomous delivery and transportation vehicles.

Preferably, the power supply system is configured such that an electrical connection may be formed between the cargo box assembly and the electrical vehicle assembly for transferring of power there between. In a preferred embodiment of the present disclosure, the electrical connection is automatically formed upon connection of the cargo box to the electrical vehicle, e.g. loading of the cargo box to said vehicle. The electrical connection may thereby be formed at a contact point between the electrical vehicle and the cargo box.

For example, the electrical vehicle may be equipped with lifting handles configured to receive a load carrier and form an electrical connection to said load carrier. The lifting handles may be configured such that the electrical connection is formed when the lifting handles lock the load carrier to the vehicle rear section. The electrical connection between the vehicle rear section and the load carrier may thereafter be constant, until the load carrier is released from the vehicle rear section.

The presently disclosed power supply system may operate in a number of modes. The power supply system may thereby be configured for selectively switching between:
a. a cargo box charging mode, wherein power is supplied from the charging station to the cargo box battery pack;
b. an assembled drive mode, wherein power is supplied from the cargo box battery pack to the traction battery pack;
c. a separated drive mode, wherein the electric vehicle assembly and the cargo box assembly is not electrically connected and power is transmitted from the traction battery pack to the drivetrain; and
d. (optionally) an electric vehicle charging mode, wherein power is supplied from the charging station to the traction battery pack.

By the use of a power supply system comprising multiple modes, a charge may be supplied to the cargo box battery pack during the cargo box charging mode. Following pick-up of the cargo box, the power supply system is put into assembled drive mode, wherein the electric vehicle may be propelled by a charge stemming from the cargo box battery pack. Following drop-off of the cargo box, the power supply system can enter separated drive mode, wherein said vehicle is powered by the traction battery pack.

It is a preference that the power supply system is configured to continuously calculate the momentarily required amount of power by the different parts of said power supply system, during each of these modes, and furthermore that the power supply system is configured to continuously control parts of the power supply system for distribution of said momentarily required amount of power.

It is a preference that the cargo box assembly comprises a cargo box management unit for communicating with other parts of the cargo box assembly. Preferably, said cargo box management unit is configured to obtain the state of other parts of the cargo box assembly and/or control parts of the power supply system such that the power requirement of each part of the cargo box assembly is met. In the same manner, it is a preference that the electric vehicle assembly comprises a vehicle management unit for communicating with other parts of the electric vehicle assembly, and preferably wherein said vehicle management unit is configured for obtaining the state of the other parts of the vehicle management unit and/or control parts of the power supply system such that the power requirement of each part of the electric vehicle assembly is met.

Furthermore, it is a preference that the vehicle management unit and the cargo box management unit is configured for electrical communication such that the vehicle management unit may request a power from the cargo box battery pack to the traction battery pack. The vehicle management unit may thereby communicate a requested power to the cargo box management unit, which may further communicate with a cargo box battery management unit and/or a cargo box first converter, for converting power from the cargo box battery pack to the traction battery pack.

Therefore, when in cargo box charging mode, the cargo box management unit may continuously calculate a cargo box requested power, which may be the momentarily calculated required power. This may be the sum of the cargo box battery pack charging power and the cargo box systems power need, and preferably calculated and communicated in real-time to the cargo box second converter.

Similarly, when the power supply system is in assembled drive mode, the vehicle management unit may obtain, such as measure, a traction battery pack charging power (Pch_ev), for momentarily charging the traction battery pack. With this information, the vehicle management unit may continuously calculate, an electric vehicle requested power (Pcb_to_ev), wherein the electric vehicle requested power (Pcb_to_ev) may be the sum of the traction battery pack charging power (Pch_ev), the momentarily vehicle electric arrangements power need (Parr_ev), and the momentarily power required for propelling the vehicle (Pdrive).

Furthermore, the vehicle management unit may continuously communicate the electric vehicle requested power, to the cargo box management unit. The power supply system, such as the cargo box battery pack and the cargo box first converter, is preferably configured such that the electric vehicle requested power may be supplied to the traction battery pack.

The electric vehicle requested power may comprise power for propelling the vehicle, power for charging the traction battery pack, power to the various electric arrangements of the electric vehicle, such as the HVAC, ePTO and a low voltage arrangement comprising an electric vehicle system battery, for powering one or more vehicle electric systems.

Consequently, the traction battery pack is preferably configured for supplying the sum of the momentarily electric vehicle systems power need (Parr_ev), and the momentarily power required for propelling the vehicle (Pdrive).

The present disclosure further relates to a cargo transport vehicle assembly, comprising a cargo box and an electric vehicle for transporting the cargo box, wherein the cargo box comprises a cargo box assembly and an electric vehicle assembly.

The present disclosure further relates to an electric vehicle, for transporting a cargo box, comprising:

a. a drivetrain;

b. a number of vehicle electric arrangements, including a low voltage arrangement comprising:

i. a vehicle system battery, for powering one or more vehicle electric systems; and ii. a vehicle first converter, for converting power from the traction battery pack to the vehicle system battery;

c. a traction battery pack, for powering the electric arrangements and the drivetrain; and d. a vehicle management unit, for acquiring one or more states of, and for controlling, parts of the electric vehicle assembly.

The present disclosure further relates to a cargo box for an electric vehicle, comprising:

a. a number of cargo box electric arrangements, including a low voltage arrangement comprising:

i. a cargo box system battery, for powering one or more cargo box electric systems; and ii. a cargo box first converter, for converting power from the cargo box battery pack to the cargo box system battery;

b. a cargo box battery pack, for powering the cargo box electric arrangements and a traction battery pack;

c. a cargo box second converter, for converting power from a charging station to the cargo box battery pack; and d. a cargo box management unit, for acquiring one or more states of, and for controlling, parts of the electric vehicle assembly, and for communicating with the vehicle management unit.

DETAILED DESCRIPTION OF THE INVENTION

Figure 1A:
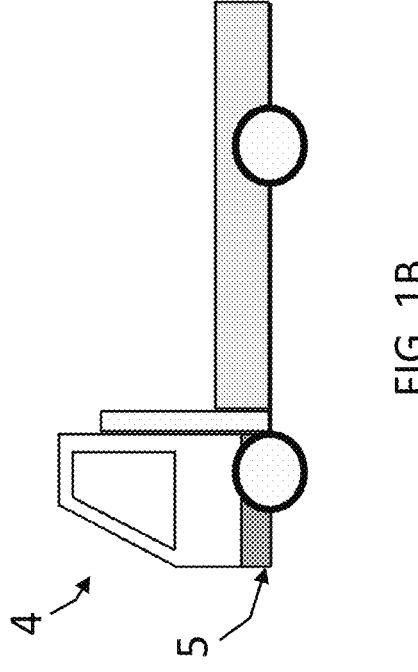
FIG. 1 shows various modes of an electric vehicle and a cargo box, and the corresponding power supply system.

A "charging system" as used herein refers to a system that is configured to transfer power to the power supply system. The charging system may require, or allow, that the power supply system is stationary or that the power supply system is moving. Typical charging systems include charging points where the power supply system is stationary and wherein said power supply system is charged conductively (e.g. through a power cable or a pic up that makes contact with and slides along a charging track), or wirelessly (e.g. through an inductive charging system). Charging systems may allow the power supply system to be moving while charging. One example of such a system is a conductive rail laid on top of a road, for example wherein the power supply system forms an electrical contact to the conductive rail through a conductive pic up. The pic up may slide along the conductive rail and be configured to transfer current to the power supply system. The picup may for example be provided as part of a "smart road" and comprise or consists or three sliding contacts arranged to form contact with plus and minus poles simultaneously. The power supply system may comprise a corresponding DC/DC converter, configured to supply a charge to batteries or power other parts of the power supply system. Other types of charging systems for stationary or dynamic charging are known to a person skilled in the art.

A "charging station", also known as "charging point", as used herein refers to a system that is configured to transfer power to a power supply system (typically of an electrical vehicle or of a cargo box) while said power supply system is stationary. The charge may be transferred conductively (i.e. through a conductive cable) or wirelessly, for example through inductive charge transfer. A charging station is consequently a type of a charging system.

The present disclosure relates to a power supply system for an electric vehicle and a cargo box configured for distribution of power between an electric vehicle assembly, and a cargo box assembly, in addition to receiving power from a charging system or a station.

An embodiment of the present disclosure relates to a power supply system for an electric vehicle and a cargo box, comprising a cargo box assembly, for being located on the cargo box. The cargo box assembly may comprise an electric vehicle assembly, for being located on the electric vehicle, comprising: a drivetrain; a number of vehicle electric arrangements, including a low voltage arrangement comprising: a vehicle system battery, for powering one or more vehicle electric systems; and a vehicle first converter, for converting power from the traction battery pack to the vehicle system battery; and a traction battery pack, for powering the electric arrangements and the drivetrain of the electric vehicle.

In an embodiment of the present disclosure, the power supply system comprises:

a. an electric vehicle assembly, for being located on the electric vehicle, comprising:

i. a drivetrain;

ii. a number of vehicle electric arrangements, including a low voltage arrangement comprising:

1. a vehicle system battery, for powering one or more vehicle electric systems; and 2. a vehicle first converter, for converting power from the traction battery pack to the vehicle system battery; and iii. a traction battery pack, for powering the electric arrangements and the drivetrain of the electric vehicle;

b. a cargo box assembly, for being located on the cargo box, comprising:

i. a number of cargo box electric arrangements, including a low voltage arrangement comprising:

1. a cargo box system battery, for powering one or more cargo box electric systems; and 2. a cargo box first converter, for converting power from the cargo box battery pack to the cargo box system battery;

ii. a cargo box battery pack, for powering the cargo box electric arrangements and the traction battery pack; and iii. a cargo box second converter, comprising an AC/DC converter and a DC/DC converter, for converting power from a charging system to the cargo box battery pack, and from the cargo box battery pack to the traction battery pack.

In specific embodiments of the present disclosure, the charging system is a charging station. Consequently, in said embodiments of the present disclosure, the power supply system may comprise:

a. an electric vehicle assembly, for being located on the electric vehicle, comprising:
   i. a drivetrain;
   ii. a number of vehicle electric arrangements, including a low voltage arrangement comprising:
      1. a vehicle system battery, for powering one or more vehicle electric systems; and
      2. a vehicle first converter, for converting power from the traction battery pack to the vehicle system battery; and
   iii. a traction battery pack, for powering the electric arrangements and the drivetrain of the electric vehicle;

b. a cargo box assembly, for being located on the cargo box, comprising:
   i. a number of cargo box electric arrangements, including a low voltage arrangement comprising:
      1. a cargo box system battery, for powering one or more cargo box electric systems; and
      2. a cargo box first converter, for converting power from the cargo box battery pack to the cargo box system battery;
   ii. a cargo box battery pack, for powering the cargo box electric arrangements and the traction battery pack; and
   iii. a cargo box second converter, comprising an AC/DC converter and a DC/DC converter, for converting power from a charging station to the cargo box battery pack, and from the cargo box battery pack to the traction battery pack.

In an embodiment of the present disclosure, the power supply system comprises an electric vehicle assembly, for being located on the electric vehicle, the electric vehicle assembly comprising a traction battery pack, and the power supply system further comprises a cargo box battery pack. Preferably the electric vehicle assembly comprises a vehicle first converter configured to convert power from, and/or to, the traction battery pack. The system may also comprise a cargo box battery pack which typically forms part of the cargo box assembly. The cargo box assembly may further comprise a cargo box first converter for converting power from, and/or to, the cargo box battery pack. In a preferred embodiment of the present disclosure, the cargo box assembly comprises a cargo box second converter, for converting power from a charging system/station to the cargo box battery pack, and preferably for converting power from the cargo box battery pack to the traction battery pack. The cargo box second converter may for example comprise or consist of one or more AC/DC converters, one or more DC/DC converters, or a combination thereof. For example the cargo box second converter may comprise or consist of an AC/DC convert and a DC/DC converter.

Preferably, the power supply system is configured such that an electrical connection may be formed between the cargo box assembly and the electrical vehicle assembly for transferring of power there between. The electrical connection may be formed by a direct physical connection (i.e. a wired connection) or a wireless connection. In a preferred embodiment of the present disclosure, the electrical connection is automatically formed upon connection of the cargo box to the electrical vehicle, e.g. loading of the cargo box to said vehicle. The electrical connection may thereby be formed at a contact point between the electrical vehicle and the cargo box.

For example, the electrical vehicle may be equipped with lifting handles configured to receive a load carrier and form an electrical connection to said load carrier. The lifting handles may be configured such that the electrical connection is formed when the lifting handles lock the load carrier to the vehicle rear section. The electrical connection between the vehicle rear section and the load carrier may thereafter be constant, until the load carrier is released from the vehicle rear section.

In a further preferred embodiment of the present disclosure, the electric vehicle assembly and/or the load carrier is configured to receive power from a charging system/station, either by a direct physical connection (i.e. a conductive/wired connection) or a wireless connection. Power transfer is further outlined in Ahmad et al., Smart Science, 6:1, 2018, 36-53 and Panchal et al., Engineering Science and Technology, an International Journal, Volume 21, Issue 5, 2018, p. 922-937. Wireless power transfer may for example be inductive, resonant inductive, capacitive or magnetic based.

The charging system/station may be any type of power source. Typically, power may be received by the power supply system from the charging system/station, after connecting the two (by direct physical connection or wirelessly). However, in specific instances the power supply system and the charging system/station may have a continuous or permanent connection, (physical or wireless) and the power supply system may receive power continuously, such as permanently, or the charging may be activated temporarily, such as upon need.

The power supply system may be configured to receive power from any type of charging system/station. For example the charging system/station may be configured to supply power through wireless power transfer or through a (direct) physical connection between the power supply system and the power source (i.e. the power source of the charging system/station). The power supplied to the power supply system through the charging system/station may be provided from an electrical grid or from a battery of the charging system/station.

A common type of charging system for electrical vehicles is a charging point, The charging point requires the electrical vehicle to be stationary in the vicinity of the charging point, and typically relies on supplying power through an electrical cable for example a IEC Type 2 or any other charging standard. However a charging point may further be configured to supply power through other means. The charging point may for example consist or comprise a parking spot that is configured for wired or wireless (e.g. inductive) charging of the electrical vehicle.

Another type of charging system is a dynamic charging system, that allows the vehicle to move while charging, for example along a road. The road may be equipped with a system for wired or wireless power transfer. In such a case the road may comprise a conductive rail, for example wherein said rail is laid on top of the road. The electrical power supply system may in this case comprise a pic up, typically under the vehicle, that is configured to connect to the rail via one or multiple sliding contacts. Other types of systems include (dynamic) charging stations relying on wireless power transfer, such as inductive power transfer. The electric vehicle may thereby move along a road comprising said charring station and wirelessly receive power. As mentioned above, different power transfer modes are described in Ahmad et al., Smart Science, 6:1, 2018, 36-53 and Panchal et al., Engineering Science and Technology, an International Journal, Volume 21, Issue 5, 2018, p. 922-937.

Said power supply system may furthermore comprise an electric vehicle assembly, for being located on the electric vehicle. Said electric vehicle assembly may comprise a number of cargo box electric arrangements, including a low voltage arrangement comprising: a cargo box system battery, for powering one or more cargo box electric systems; and a cargo box first converter, for converting power from the cargo box battery pack to the cargo box system battery; a cargo box battery pack, for powering the cargo box electric arrangements and the traction battery pack; and a cargo box second converter for converting power from a charging station to the cargo box battery pack.

It is a preference that the cargo box assembly comprises a cargo box management unit for communicating with other parts of the cargo box assembly. Preferably, said cargo box management unit is configured to obtain the state of other parts of the cargo box assembly and/or control parts of the power supply system such that the power requirement of each part of the cargo box assembly is met. In the same manner, it is a preference that the electric vehicle assembly comprises a vehicle management unit for communicating with other parts of the electric vehicle assembly, and preferably wherein said vehicle management unit is configured for obtaining the state of the other parts of the vehicle management unit and/or control parts of the power supply system such that the power requirement of each part of the electric vehicle assembly is met.

Furthermore, it is a preference that the vehicle management unit and the cargo box management unit is configured for electrical communication such that the vehicle management unit may request a power from the cargo box battery pack to the traction battery pack. The vehicle management unit may thereby communicate a requested power to the cargo box management unit, which may further communicate with a cargo box battery management unit and/or a cargo box first converter, for converting power from the cargo box battery pack to the traction battery pack.

Modes

In a further embodiment of the present disclosure, the power supply system is configured for selectively switching between a number of electrical modes. Wherein each mode is for being used during different stages of the service of an electric cargo vehicle, such as during charging, during transportation of a cargo box, and during deadheading. Thereby, the power supply system may be configured for selectively switching between a cargo box charging mode, an assembled drive mode and a separated drive mode.

In another embodiment of the present disclosure, the modes further comprise an electric vehicle charging mode, wherein power is supplied from a charging station to the traction battery pack. It is a preference that the power supply system further comprises a vehicle second converter, for converting power from the charging station to the traction battery pack.

Preferably, in the cargo box charging mode, the power supply system is configured for receiving power from a charging station, such as by the cargo box battery pack. Alternatively, the power supply system could be configured for receiving power from another type of charging system. The power supply system may be configured such that, upon activation of the cargo box charging mode, parts of the power supply system, such as a cargo box management unit, reconfigures other parts of the power supply system, such as a cargo box second converter, for receiving power from a charging system (charging station). Thereby, a management unit, such as the cargo box management unit, may communicate with a converter, such as the cargo box second converter, such that the converter supplies a suitable DC voltage to a battery pack, such as the cargo box battery pack. In the cargo box charging mode, power is typically supplied while the cargo box is stationary (i.e. by a charging station). Power may for either be supplied through wired power transfer, e.g. through an electric cable, or through wireless power transfer, e.g. through a parking spot comprising an inductive charging unit.

Preferably the cargo box comprises a cargo box second converter for converting power from a charging system (typically a charging station) to the cargo box battery pack. Thereby, said converter may be configured to rectify alternating current, received from the charging system (typically a charging station), to direct current for the power supply system. The direct current may thereby be supplied to the cargo box battery pack. For receiving power from the charging system (typically a charging station), the power supply system may, preferably continuously and in real-time, calculate the required power. The cargo box second converter may be configured, preferably continuously and in real-time, by the use of said calculated required power, to receive power from the charging system (typically a charging station).

Furthermore, the cargo box preferably comprises one or more electric systems, electrically connected to the cargo box system battery. The power supply system is preferably configured such that, when the power supply system is in cargo box charging mode, power may be supplied from the cargo box battery pack to the cargo box system battery and/or the one or more cargo box electric systems. Preferably, the power supply system is configured such that, in cargo box charging mode, power may be supplied from the cargo box battery pack, to the cargo box electric systems. The power supply system, such as the cargo box assembly of the power supply system, may additionally or alternatively be configured to receive power from energy generators, such as solar generators preferably mounted on the roof of the cargo box.

Figure 4:
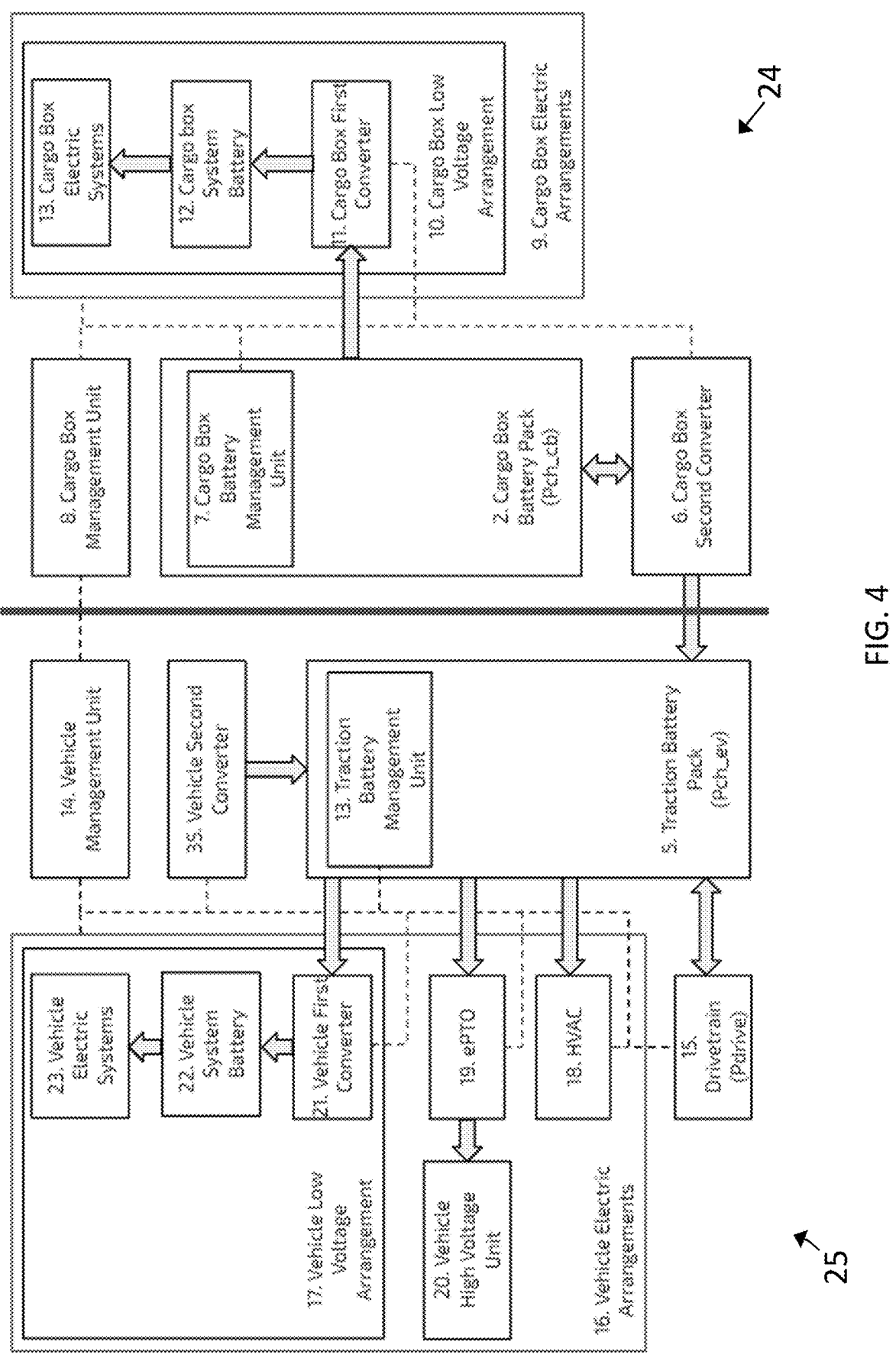
FIG. 4 shows the configuration of components of a power supply system in assembled charging mode.

It is a further preference that, when the power supply system is in the assembled drive mode, the power supply system is configured such that power may be supplied from the cargo box battery pack to the traction battery pack, such as at around 3.7 kW and for example 1 phase 16 A. The cargo box battery pack is preferably significantly larger than the traction battery pack. While the traction battery pack may typically be used for powering the vehicle when going a smaller distance towards a pick-up point, the cargo box battery pack may be used for propelling the electric vehicle to transport the cargo box between the pick-up point and the drop-off point, typically a longer distance, and in combination with the presence of the cargo box, more power is made available to propel the electric vehicle assembly. In a specific embodiment of the present disclosure, the power supply system is configured, in the assembled drive mode, to receive power from a charging system, e.g. to the traction battery pack or the cargo box battery pack, through wired or wireless power transfer, as disclosed elsewhere herein. Typically, the charge is received by the vehicle second converter and/or the cargo box second converter respectively, in said assembled drive mode. For example the charging system may be provided as part of a road, for example a conductive track of said road, and wherein an electrical connection is formed between the charging system and the power supply system, while the power supply system is in movement. As can be seen in FIG. 4, the vehicle second converter and/or the cargo box second converter may be configured to supply the power supply system, e.g. the traction battery pack and the cargo box battery pack respectively, with power from a charging system. In instances where power is received by the cargo box second converter from a charging system, power may be provided to the cargo box battery pack and/or the traction battery pack. In an embodiment of the present disclosure, the power supply system is configured such that, when in assembled drive mode, the power supply system is configured for receiving power from a charging station by the cargo box second converter. The cargo box second converter may supply power received from the charging system to the cargo box battery pack. In an embodiment the power received from the charging system is only supplied to the cargo box battery pack. In such an instance the power supply system may distribute power received by the cargo box battery pack to other parts of said power supply system, for example through the cargo box second converter. The cargo box second converter may therefore in certain instances both supply and receive power from the cargo box battery pack, such as simultaneously or sequentially.

Preferably, in an assembled charging mode, the power supply system is configured to receive power, such as from a charging system (typically a charging station), and preferably converted by the cargo box second converter. It is a further preference that, in the assembled charging mode, the power supply system is configured for sequentially charging batteries of the power supply system, such as the traction battery pack and the cargo box battery pack. The power supply system may, while receiving power, such as from a charging station, for example be configured to provide power to the cargo box battery pack until fully charged, before switching to powering the traction battery pack. Preferably, the cargo box second converter in assembled charging mode is configured for sequential charging of batteries of the power supply system, such as the cargo box battery pack and the traction battery pack. Power may be received, such as by the cargo box second converter, from a charging station, such as at around 700 V at 11 kW and for example 3 phases and 16 A, and converted to around 300-400 V and sequentially distributed to the cargo box battery pack and the traction battery pack. Preferably, the vehicle management unit and the cargo box management unit is configured to communicate the state of the power supply system such that power received by the power supply system can be sequentially distributed to batteries of the power supply system. Typically, assembled charging mode is used for supplying power to the power supply system at charging stations that requires the power supply system to be stationary, e.g. a charging point. For example when power is received through an electrical cable. In other instances, power may be supplied while the power supply system is in movement, e.g. in assembled drive mode or separated drive mode.

Therefore, it is a preference that the traction battery pack is small and the cargo box battery pack is large. The electric vehicle may be a truck comprising a cargo box with a battery pack that may have a capacity of 45 kWh, or even larger, while the traction battery pack may have a capacity of 5 kWh or even smaller, for example the total battery capacity of the cargo box battery pack and the traction battery pack may be around 50 kWh. Alternatively, for other types of vehicles, the battery capacity is configured to match the vehicle's total weight and work range. As an example, for an electric cargo bike the battery capacity is preferably smaller than for an electric cargo truck, and the cargo box battery pack may have a capacity of around 4 kWh, while the electric vehicle battery pack may have a capacity of around 1 kWh, or even smaller.

Figures 2, 3:
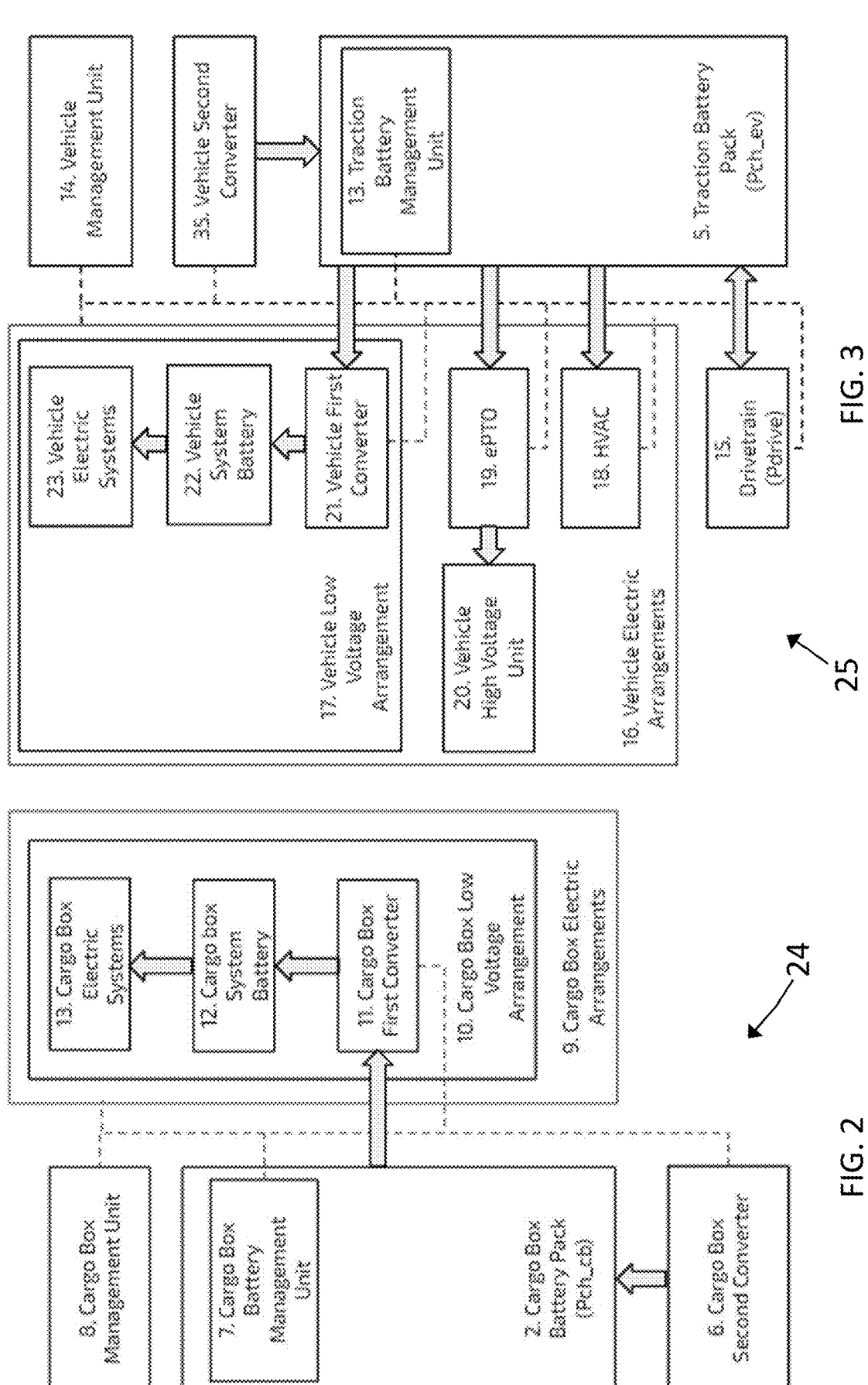
FIG. 2 shows the configuration of components of a power supply system in cargo box charging mode.
FIG. 3 shows the configuration of components of a power supply system in separated drive mode.

It is a further preference that the power supply system, when in the separated drive mode, is configured such that the power may be transmitted from the traction battery pack to the drivetrain, for propelling the electric vehicle. In the separated drive mode, the electric vehicle assembly and the cargo box assembly may be separated, such as not electrically connected. Thereby, the electric vehicle may be, when in separated drive mode, powered by the traction battery pack. In an embodiment of the present disclosure, the power supply system is configured to also receive power in the separated drive mode, e.g. the traction battery pack and/or the vehicle battery pack, from a charging system/station through wired or wireless power transfer, as disclosed elsewhere herein. Typically, the charge is received by the vehicle second converter and/or the cargo box second converter respectively, in said separated drive mode. For example the charging system may be provided as part of a road, for example a conductive track of said road, and wherein an electrical connection is formed between the charging system and the power supply system, while the power supply system is in movement. As can be seen in FIG. 3, the vehicle second converter may supply the power supply system, e.g. the traction battery pack with power, from the charging system.

Furthermore, when the power supply system is in the separated drive mode and/or the electric vehicle charging mode, the power supply system is preferably configured such that power is supplied from the traction battery pack to the vehicle system battery and/or the one or more vehicle electric systems. The power supply system, such as the electric vehicle assembly of the power supply system, may additionally or alternatively be configured to receive power, for example by regenerative braking, during lowering of the cargo box, and/or energy generators, such as solar generators.

In an embodiment of the present disclosure, the power supply system is configured to activate, such as engage, the cargo box charging mode, upon electrically connecting the cargo box second converter and the charging station. The cargo box management unit may be configured to communicate with the charging station, such as when electrically connected. Thereby, when connecting the power supply system, such as the cargo box secondary converter, to the charging station, the power supply system may be configured to receive a signal from the charging station. Similarly, the power supply system may further be configured to activate the assembled drive mode, upon electrically disconnecting the cargo box second converter from the charging station; or upon electrically connecting the cargo box assembly and the electric vehicle assembly. Assembled drive mode, may thereby be activated when there is no communication between the charging station and the power supply system. Alternatively, the assembled drive mode may be activated upon electrically connecting the cargo box assembly and electric vehicle assembly, e.g. when the cargo box management unit is able to communicate with the vehicle management unit. Preferably, the assembled drive mode is only activated when the cargo box assembly and the electric vehicle assembly is electrically connected.

In an embodiment of the present disclosure, the power supply system is configured to activate, such as engage, the electric vehicle charging mode, upon electrically connecting the vehicle second converter and the charging station. The vehicle management unit may be configured to communicate with the charging station, such as when electrically connected. Thereby, when connecting the power supply system, such as the electric vehicle secondary converter, to the charging station, the power supply system may be configured to receive a signal from the charging station. Similarly, the power supply system may further be configured to activate the separated drive mode, upon electrically disconnecting the cargo box second converter from the charging station. Separated drive mode, may thereby be activated when there is no communication between the charging station and the power supply system, such as the vehicle second converter. Preferably, separated drive mode is only activated when there is no electrical connection between the electric vehicle assembly and the cargo box assembly.

AC/DC/DC

In an embodiment of the present disclosure, the cargo box second converter comprises an AC/DC/DC converter, configured for switching between: an AC/DC mode and a DC/DC mode.

Preferably, the cargo box second converter is configured for switching to, such as activating, AC/DC mode of the AC/DC/DC converter when the power supply system is in cargo box charging mode, for power conversion between the charging station, and the cargo box battery pack. The power supply system may thereby be configured to receive power from the charging station in the form of alternating current, and rectify said power to direct current for distribution to other parts of the power supply system, such as the cargo box battery pack.

The power supply system is preferably configured such that the AC/DC mode is activated upon connecting the cargo box assembly to a charging station. The cargo box management unit may, upon communication with the charging station, switch to, such as activate, the AC/DC mode of the AC/DC/DC converter.

It is a further preference that the power supply system is configured for switching to, such as activating, the DC/DC mode of the AC/DC/DC converter when the power supply system is in assembled drive mode. The power supply system may thereby, when in DC/DC mode, be configured for power conversion between the cargo box battery pack and the traction battery pack.

It is a further preference that the power supply system is configured for switching to, such as to activate, DC/DC mode of the AC/DC/DC converter, upon disconnecting the cargo box assembly from the charging station. The cargo box management unit may be configured to, upon disconnecting the cargo box assembly from the charging station, activate the DC/DC mode of the AC/DC/DC converter.

Additionally, the power supply system is preferably configured to activate the DC/DC mode of the AC/DC/DC converter, upon connecting the cargo box assembly to the electric vehicle assembly, such as by the vehicle management unit of the power supply system. It may however be a preference that DC/DC mode is only activated when the cargo box assembly is not connected, such as electrically connected, to a charging station.

AC/DC & DC/DC

In an alternative embodiment of the present disclosure, the cargo box second converter comprises an AC/DC converter and a DC/DC converter. It is a preference that the AC/DC converter is configured for power conversion between the charging station and the cargo box battery pack, such as when the power supply system is in the cargo box charging mode. It is a further preference that the DC/DC converter is configured for power conversion between the cargo box assembly and the electric vehicle assembly, such as when the power supply system is in assembled drive mode.

In an embodiment of the present disclosure, the traction battery pack comprises a traction battery management unit and/or the cargo box battery pack comprises a cargo box battery management unit. Thereby, either of the cargo box battery pack and/or the traction battery pack may comprise an electronic system configured for managing the battery, such as protecting the battery from operating outside its safe operating area, monitoring its state, calculating data, reporting data, controlling its environment, authenticating and/or balancing the battery pack.

In another embodiment of the present disclosure, the vehicle electric arrangements are electric arrangements that require a higher voltage than the voltage supplied by the electric vehicle system battery, such as when fully charged, such as an electric power takeout (ePTO), a HVAC unit (heat, ventilation and air conditioning), and a hydraulic system, for lifting the cargo box. Alternatively or additionally, the cargo box electric arrangements may be electric arrangements that require a higher voltage than the voltage supplied by the cargo box system battery, when fully charged, such as a refuse compactor or a refrigerator unit.

DC/DC & DC/DC

In an alternative embodiment of the present disclosure, the cargo box second converter comprises an external converter and an internal converter. It is a preference that the external converter is configured for power conversion between the charging system/station and the cargo box battery pack, such as when the power supply system is in the cargo box charging mode (in AC or DC). It is a further preference that the internal converter is configured for power conversion between the cargo box assembly and the electric vehicle assembly (typically DC/DC conversion), such as wherein the power supply system is in assembled drive mode.

Cargo Box Requested Power

In an embodiment of the present disclosure, when the power supply system is in cargo box charging mode, the cargo box management unit is configured to calculate a cargo box requested power (Pcs_to_cb). The cargo box management unit thereby preferably comprises means for deriving, such as calculating, a cargo box requested power (Pcs_to_cb). The cargo box management unit may further comprise means for communicating with other components of the power supply system, for obtaining the cargo box requested power, such as a cargo box battery management unit, the cargo box secondary converter, the cargo box electronic systems, and/or the vehicle management unit.

It is a preference that the cargo box requested power (Pcs_to_cb) is based on, such as derived from, a cargo box battery pack charging power (Pch_cb), such as provided from the cargo box battery management unit, and a cargo box electric arrangements power need (Parr_cb), such as the momentarily power need of the cargo box electric arrangements. Preferably the cargo box battery pack charging power (Pch_cb) and the cargo box electric arrangements power need (Parr_cb) is continuously measured or calculated, thereby the momentarily cargo box battery pack charging power and/or momentarily cargo box electric arrangements power need may be derived. It is a further preference that the cargo box battery pack charging power (Pch_cb) and the cargo box electric arrangements power need (Parr_cb) are continuously and/or momentarily measured and/or calculated.

In an embodiment of the present disclosure, the cargo box requested power (Pcs_to_cb) is derived from the continuously calculated cargo box battery pack charging power (Pch_cb) and the momentarily cargo box electric arrangements power need (Parr_cb). The cargo box requested power may for example be the sum of the continuously calculated cargo box battery pack charging power (Pch_cb) and the momentarily cargo box electric arrangements power need (Parr_cb).

In a further embodiment of the present disclosure the cargo box management unit continuously communicates the cargo box requested power (Pcs_to_cb), to the cargo box second converter. The cargo box second converter, that may be connected, such as electrically connected, to the charging station, may be configured to use the communicated cargo box requested power for adjusting the charging power, i.e. the power transferred from the charging station to the cargo box second power converter.

In yet another embodiment of the present disclosure the power supply system is configured to calculate and communicate the cargo box requested power in substantially real-time. Such as, the management unit is configured to continuously calculate and communicate the cargo box requested power in real-time. Thereby, the cargo box first power converter may continuously receive a momentarily value of the cargo box requested power.

Electric Vehicle Requested Power

In an embodiment of the present disclosure, when in electric vehicle charging mode, the vehicle management unit obtains, such as calculates, an electric vehicle charging power (Pcs_to_ev). Preferably the vehicle management unit is configured to continuously obtain, such as continuously calculate the electric vehicle charging power. It is a further preference, that the vehicle management unit continuously communicates the electric vehicle charging power (Pcs_to_ev), to the vehicle second converter. The vehicle management unit, may thereby, control the power provided to the traction battery pack. The electric vehicle may base the control of said power on calculations, and further on input from other parts of the electric vehicle assembly, such as the vehicle electric arrangements, the traction battery management unit, and/or the drivetrain. In a preferred embodiment of the present disclosure, the drivetrain is an electric drivetrain. Thereby, the electric vehicle may be an all-electric vehicle, such as relying solely on an electric motor for propulsion.

In an embodiment of the present disclosure the power supply system is, when in assembled drive mode, configured to calculate a traction battery pack charging power (Pch_ev), for charging the traction battery pack. Said traction battery pack charging power is preferably calculated by the vehicle management unit.

In an embodiment of the present disclosure, when in assembled drive mode, the vehicle management unit calculates an electric vehicle requested power (Pcb_to_ev). Preferably, the vehicle management unit is configured for continuously deriving the electric vehicle requested power.

In an embodiment of the present disclosure the power supply system is, when in assembled drive mode, configured to calculate an electric vehicle requested power (Pcb_to_ev). Said electric vehicle requested power is preferably calculated by the vehicle management unit.

In an embodiment of the present disclosure the electric vehicle requested power (Pcb_to_ev) is based on, such as derived from, any of the traction battery pack charging power (Pch_ev), a momentarily vehicle electric arrangements power need (Parr_ev) and a momentarily electric vehicle power required for propelling the vehicle (Pdrive) or a combination thereof.

In an embodiment of the present disclosure the electric vehicle requested power (Pcb_to_ev) is derived from the traction battery pack charging power (Pch_ev), the momentarily vehicle electric arrangements power need (Parr_ev), and the momentarily power required for propelling the vehicle (Pdrive). The electric vehicle requested power (Pcb_to_ev) may for example be the sum of the traction battery pack charging power (Pch_ev), the momentarily vehicle electric arrangements power need (Parr_ev), and the power required for propelling the vehicle (Pdrive), such as the momentarily power required for propelling the vehicle.

In an embodiment of the present disclosure the vehicle management unit communicates, preferably continuously, the electric vehicle requested power (Pcb_to_ev), to the cargo box management unit. It may thereby be a preference that the momentarily calculated electric vehicle requested power is continuously communicated to the cargo box management unit.

In an embodiment of the present disclosure the power supply system is configured to calculate and communicate in substantially real-time, such as in real-time, the electric vehicle requested power. Preferably, the vehicle management unit communicates, continuously and in real-time, the electric vehicle requested power (Pcb_to_ev), to the cargo box management unit.

Electrical Devices

In a preferred embodiment of the present disclosure the power supply system is configured to power any of sensors, actuators, intelligent entry system, GPS, lighting, surveillance, cooling, heating and means for communication. The power supply system is preferably configured to supply power to one or more cargo box electric systems selected from the list including sensors, actuators, intelligent entry system, GPS, lighting, surveillance, cooling, heating and means for communication.

The cargo box is preferably configured such that it may be positioned at a location for a substantial amount of time, such as at least multiple hours, preferably day(s), during which, the cargo box battery pack and/or the cargo box system battery may power the cargo box electric arrangements, such as the cargo box electric systems of the cargo box low voltage arrangement. Preferably the cargo box system battery receives power from the cargo box battery pack. The cargo box system battery may for example be a 12 V battery pack, a 24 V battery pack, or any battery suitable for powering cargo box electric systems. In certain applications, it may be an advantage that the cargo box system battery is lighter and smaller than the cargo box battery pack. It may further be an advantage that the power supply system is configured to receive power by a power generator, such as a solar generator. Thereby, the duration during which the charge of the batteries of the cargo box can be used to power the electrical devices of the cargo box may be prolonged.

In a preferred embodiment of the present disclosure the power supply system, such as the electric vehicle assembly, such as by the low voltage arrangement, is configured for powering any of a hydraulic system, for lifting the cargo box, AC, heating, servo, lights, signals, GPS, means for communication. The power supply system, such as the electric vehicle assembly, such as by the low voltage arrangement, may thereby be configured to supply power to one or more cargo box electric systems selected from the list including a hydraulic system, for lifting the cargo box, HVAC, servo, lights, signals, GPS and means for communication.

In an embodiment of the present disclosure, the electric vehicle assembly is configured for communication between the vehicle management unit and any of: the vehicle electric arrangements, the drivetrain, the traction battery management unit, the traction battery pack, the charging station, and/or the electric vehicle secondary converter, such as by a data bus. The electric vehicle assembly may thereby obtain the state of said other parts of the electric vehicle assembly, or any other information related to said other parts, and may use said information for controlling parts of the power supply system.

In another embodiment of the present disclosure, the cargo box assembly is configured for communication between the cargo box management unit and any of: the cargo box electric systems, the cargo box electric arrangements, the cargo box first converter, the cargo box, the cargo box low voltage arrangement, the cargo box battery management unit, the cargo box battery pack, the charging station, and/or the cargo box secondary converter, such as by a data bus. The cargo box assembly may thereby obtain the state of said other parts of the cargo box assembly, or any other information related to said other parts, and may use said information for controlling parts of the power supply system. Furthermore, it is a preference that the cargo box management unit is configured for communication with the vehicle management unit.

In a preferred embodiment of the present disclosure, the power supply system is configured for communication between the vehicle management unit and the cargo box management unit, such as by a data bus. Said communication may only be possible when there is an electrical connection between the cargo box assembly and the electric vehicle assembly, such as in assembled drive mode. Alternatively, the electric vehicle assembly and the cargo box assembly may comprise wireless communication means, for wireless communication between the vehicle management unit and the cargo box management unit. Thereby, said management units may communicate even though the electric vehicle assembly and the cargo box assembly are not electrically connected.

As disclosed elsewhere herein the power supply system may be configured to receive power from a charging system/station through wired or wireless power transfer. The charging system/station may require the vehicle to be stationary, i.e. the charging system is a charging point, or the charging system may allow or require the vehicle to move along the charging system. For example the charging system may be provided as a conductive, inductive or capacitive power transfer system as part of a road.

For a charging point, the power may be supplied to the power supply system through an electrical cable, for example according to any electrical charging standard, such as in DC or AC. The electrical cable preferably has a standard vehicle connector.

In an embodiment of the present disclosure the electrical connection between the electric vehicle assembly and the cargo box assembly and/or between the cargo box assembly and the charging station is formed by a vehicle connector, preferably a standard vehicle connector such as defined by IEC 62196 or SAE J1772. The electrical connection may thereby be formed by an IEC 62196 Type 2 connector or a SAE J1772 connector, such as the SAE J1772-2009.

The electrical connection may be formed by a rapid AC charger providing a power at 43 kW (three-phase, 63 A) using the Type 2 charging standard, or a fast charger, such as rated at either 7 kW or 22 kW (single- or three-phase 32 A). In yet another alternative, the electrical connection may be formed by a slow charging connector rated at between 2.3 kW and 6 kW, such as 3.6 kW (16 A).

In an embodiment of the present disclosure, the electrical connection between the electric vehicle assembly and the cargo box assembly is formed between two DC connectors, such as IEC 62196-3 Type 1 DC connector, IEC 62196-3 Type 2 DC connector or GB Part 3 DC connector, or wherein said connection is formed between two combined AC/DC charging connectors, such as IEC 62196-3 Type 1 AC/DC connectors or IEC 62196-3 Type 2 AC/DC connectors.

In an embodiment of the present disclosure, the electrical connection between the charging station and, the cargo box or the electric vehicle, is formed between two AC connectors, such as between the charging station and, the cargo box assembly or the electric vehicle assembly. Said AC connectors are preferably standard connectors, such as an IEC 62196 Type 2 connector, IEC 62196-2 Type 1 AC connector, IEC 62196-2 Type 2 AC connector, GB Part 2 AC connector, a SAE J1772 connector, or wherein said connection is formed between two combined AC/DC charging connectors, such as IEC 62196-3 Type 1 AC/DC connectors or IEC 62196-3 Type 2 AC/DC connectors. A voltage of 110/120 V may thereby be used for providing power to the power supply system, alternatively the voltage may be between 120-240, such as at up to 80 amperes. Alternatively, or additionally, the voltage may be 400 V, at three phase, such as at up to 63 amperes.

DETAILED DESCRIPTION OF DRAWINGS

The invention will in the following be described in greater detail with reference to the accompanying drawings. The drawings are exemplary and are intended to illustrate some of the features of the presently disclosed power supply system for an electric vehicle and cargo box, cargo transport vehicle assembly comprising a power supply system, electric vehicle, and cargo box, and are not to be construed as limiting to the presently disclosed invention.

Figure 1B:
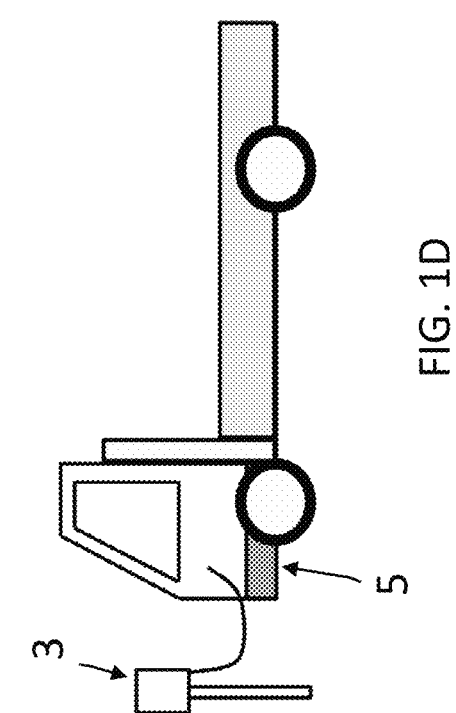
Figure 1C:
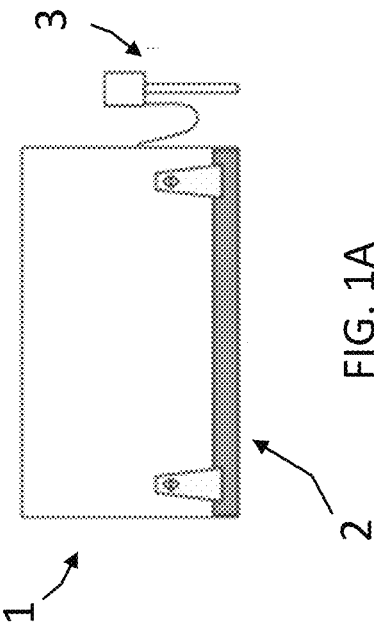
Figure 1D:
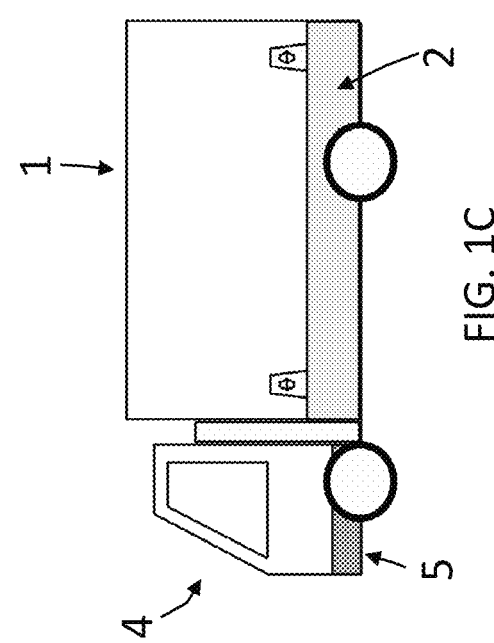

FIG. 1A shows a cargo box (1) comprising a cargo box battery pack (2) being recharged at a charging system (here exemplified as a charging station) (3). The power supply system may, upon electrically connecting the cargo box assembly and the charging system (i.e. the charging station), activate cargo box charging mode, for supplying power from the charging station to the power supply system. In cargo box charging mode the cargo box may for example be recharged while waiting for being picked-up by an electric vehicle (4), as shown in FIG. 1B. The electrical vehicle preferably comprises a traction battery pack (5) for powering the electric arrangements and the drivetrain of the electric vehicle. Thereby, the electric vehicle may be powered by an internal battery, typically for shorter distances, in separated drive mode. Typically the traction battery pack is smaller than the cargo box battery. When the electric vehicle (4) picks up the cargo box (1), the power supply system preferably activates assembled drive mode, FIG. 1C. Assembled drive mode may for example be activated upon electrically connecting the electrical vehicle and the cargo box, i.e. the electrical assembly of the power supply system and the cargo box assembly of the power supply system. In assembled drive mode the traction battery pack (5) may receive power from the cargo box battery pack (2). The traction battery pack may further power the electric arrangements and the drivetrain of the electric vehicle. Following drop-off of the cargo box (1), the electric vehicle (4) may need to relocate to another location for pick-up of another cargo box, and may consequently activate separated drive mode. Furthermore, the electric vehicle (3) may be charged by a charging station (3), FIG. 1D. The charging station may thereby supply power to the traction battery pack (5), of the electric vehicle.

The power supply system may switch between a number of modes, wherein power is distributed differently between the parts of the power supply system. When the Cargo box is dropped-off at a location, the cargo box may be connected to a charging station, and thereby, the power supply system may activate the cargo box charging mode, FIG. 2. Following electrical connection to a charging station, the cargo box battery pack (6) may receive power from a charging station. The cargo box assembly (24) of the power supply system, may thereby comprise a cargo box battery pack, which in turn may comprise a cargo box battery management unit (7). The power supplied by the charging station may be converted by the cargo box second converter (6) before being supplied to the Cargo box battery pack. The cargo box battery management unit may be an electric system configured to manage the cargo box battery, such as by protecting the battery from operating outside its safe operating area, monitoring its state, calculating secondary data, reporting that data, controlling its environment, authenticating it and/or balancing it. The cargo box battery management unit, and/or the cargo box battery pack, may be configured for communication with the cargo box management unit (8). The cargo box management unit is preferably configured for acquiring one or more states of parts of the cargo box assembly. Furthermore, the cargo box management unit may be configured for assessing the state of a part of the power supply system, such as the cargo box assembly, and, based on said assessment, communicating with parts of the power supply system for requesting state changes, such as a requested power between parts of the power supply system, and/or the activation of DC mode or AC mode. The cargo box battery pack may supply power to a number of cargo box electric arrangements (9). Typically, the power is supplied with a relatively high voltage, such as around 400 V-800 V. The cargo box electric arrangements comprises a cargo box low voltage arrangement (10), comprising a cargo box system battery (12), for example a 12 V or 24 V battery, for powering one or more cargo box electric systems (13); and a cargo box first converter (11), for converting power from the cargo box battery pack to the cargo box system battery. Electric systems requiring a lower voltage than what may be supplied from the cargo box battery pack may thereby receive power from the cargo box first converter and/or the cargo box system battery.

When the cargo box is not connected to the electric vehicle, for example due to having been dropped off, the electric vehicle may need to relocate without being electrically connected to the cargo box. Under such circumstances, it is a preference that the electric vehicle assembly (25) is in separated drive mode, FIG. 3, wherein power may be supplied to the drivetrain (15), and other parts of the electric vehicle assembly, from the traction battery pack (5), while not electrically connected to the cargo box assembly. In specific embodiments of the present disclosure, power may be received from a charging system, while the power supply system is moving, i.e. while the vehicle is in transit. Power may be received by the vehicle second converter (35) and is typically provided to the traction battery pack (5). The traction battery pack may comprise a traction battery management unit (13), which may be an electric system configured to manage the traction battery pack, such as by protecting said battery from operating outside its safe operating area, monitoring its state, calculating secondary data, reporting that data, controlling its environment, authenticating it and/or balancing it. Preferably the traction battery management unit and/or the traction battery pack is configured for communication with a vehicle management unit (14). The vehicle management unit is preferably configured for acquiring one or more states of parts of the cargo box assembly. Furthermore, the vehicle management unit may be configured for assessing said state of a part of the power supply system, and, based on said assessment, communicating with parts of the power supply system for requesting a necessary change of a state, for example such that a requested power can be provided to a part of the power supply system. The traction battery pack may further provide power to the electric drivetrain (15), for propelling the electric vehicle, or receive power from the electric drivetrain (15) by for example regenerative braking. The traction battery may further provide power to a number of vehicle electric arrangements (16), including a vehicle low voltage arrangement (17) comprising: a vehicle system battery (22), for powering one or more vehicle electric systems (23), for example a 12 V or 24 V battery; and a vehicle first converter (21), for converting power from the traction battery pack (21) to the vehicle system battery (22), and/or other parts of the vehicle low voltage arrangement. Typically, the power supplied from the traction battery pack is between around 300 V to 400 V. The vehicle electric arrangement may comprise a HVAC arrangement (18) for providing heat, ventilation and air conditioning. Furthermore, the vehicle electric arrangements may comprise an electric power take out (ePTO, 19), for supplying high power, typically at least a voltage of 300-400 V to a number of vehicle high voltage units, for example the power may be around 5 kW for each high voltage unit or around 3.7 kW at 1 phase and 16 A. The vehicle management unit may thereby be connected to all parts of the electric vehicle assembly, and may communicate with said parts such that power is distributed between the electric vehicle assembly according to the momentary need of each part of said assembly.

Upon electrically connecting the electric vehicle assembly (25) and the cargo box assembly (24), for example when the electric vehicle picks up the cargo box, the power supply system is preferably configured to activate the assembled drive mode, FIG. 4. Herein, the vehicle management unit (14) and the cargo box management unit may communicate wired, or wirelessly, with each other. Thereby, said management units may communicate the present state of the power supply system, and further request power to specific parts of the power supply system according to the momentary need. Typically, the power supply system is configured to provide power from the cargo box battery pack (2) to the traction battery pack (5). The charge provided may be the electric vehicle requested power (Pcb_to_ev), which preferably is the sum of the traction battery pack charging power (Pch_ev), such as the power by which the traction battery pack may be charged, the vehicle electric arrangements power need (Parr_ev), and the power required for propelling the vehicle (Pdrive), such as the momentary power required for propelling the vehicle. The cargo box battery pack may further, preferably simultaneously, provide power to the cargo box electric arrangements (9), such as the cargo box low voltage arrangement (10). Furthermore, the traction battery pack may provide the vehicle electric arrangements (16), such as the HVAC (18), the ePTO (19), and the vehicle low voltage arrangement (17) with power. In specific embodiments of the present disclosure, power may be received from a charging system, while the power supply system is moving, i.e. while the vehicle is in transit. Power may be received by the vehicle second converter (35) and provide said charge to the traction battery pack (5) and/or the cargo box second converter (6) and provide said charge to the cargo box battery pack (2). Typically, when the power supply system, in assembled drive mode, receives a charge through the cargo box second converter from a charging system, power is supplied to the cargo box battery pack and/or to the traction battery pack. In other cases, when the power supply system is not in contact with a charging system, power is typically provided from the cargo box battery pack to the cargo box second converter.

Figure 5:
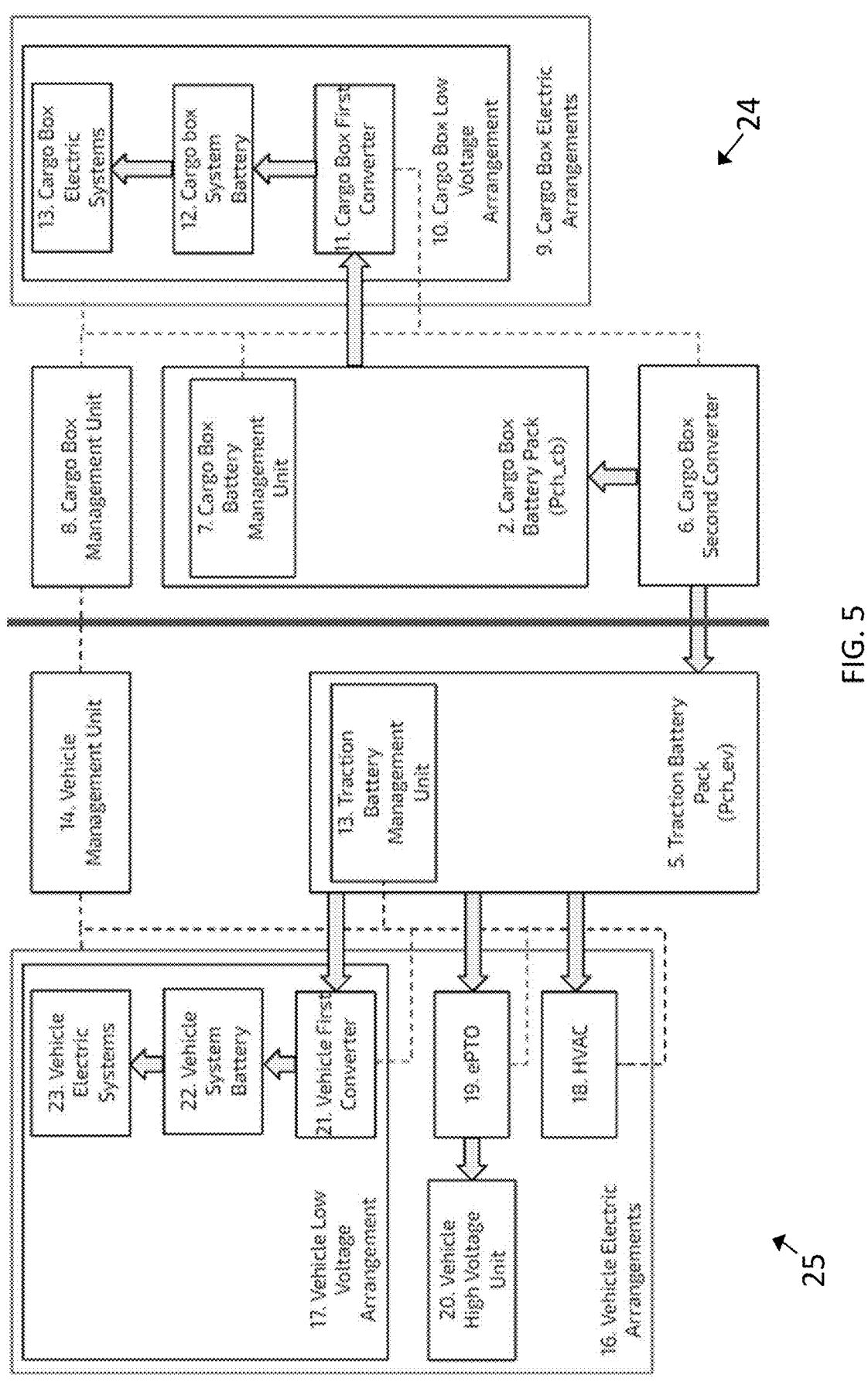
FIG. 5 shows the configuration of components of a power supply system in assembled drive mode.
Figure 6:
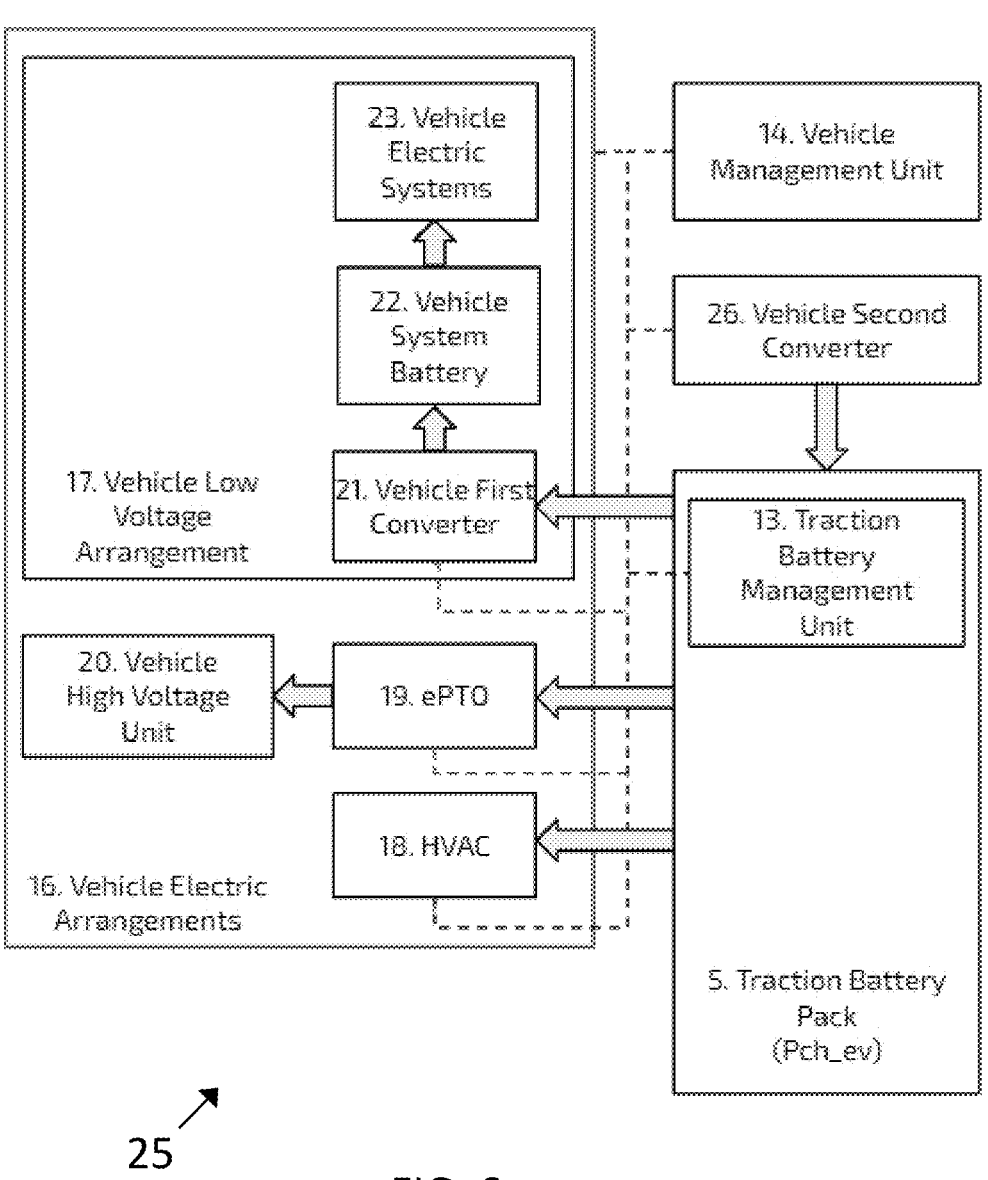
FIG. 6 shows the configuration of components of a power supply system in electric vehicle charging mode.

Preferably, the power supply system may be charged in an assembled charging mode, wherein the electric vehicle assembly (25) and the cargo box assembly (24) is electrically connected, FIG. 5. The power supply system may thereby be configured to receive power, such as from a charging station, and preferably converted by the cargo box second converter (6). It is a further preference that, in the assembled charging mode, the power supply system is configured for sequentially charging batteries of the power supply system, such as the traction battery pack (5) and the cargo box battery pack (2). The power supply system may, while receiving power, such as from a charging station, be configured to provide power to the cargo box battery pack until fully charged, before switching to powering the traction battery pack. Preferably, the cargo box second converter is, in assembled charging mode, configured for sequential charging of batteries of the power supply system, such as the cargo box battery pack and the traction battery pack. Power may be received, such as by the cargo box second converter, from a charging station, such as at around 700 V at 11 kW and for example 3 phases and 16 A, and converted to around 300-400 V and sequentially distributed to the cargo box battery pack and the traction battery pack. Preferably, the vehicle management unit and the cargo box management unit is configured to communicate the state of the power supply system such that power received by the power supply system can be sequentially distributed to batteries of the power supply system. It is a further preference that the traction battery pack does not power the drivetrain in assembled charging mode. The cargo box battery pack may further, in assembled charging mode, provide power to the cargo box electric arrangements (9), such as the cargo box low voltage arrangement (10). Furthermore, in assembled charging mode, the traction battery pack may provide the vehicle electric arrangements (16), such as the HVAC (18), the ePTO (19), and the vehicle low voltage arrangement (17) with power.

The electric vehicle assembly may additionally receive power from a charging station, such as when the electric vehicle assembly is in electric vehicle charging mode, FIG.

6. In electric vehicle charging mode, power is supplied from the charging station to the traction battery pack (5). Preferably, the vehicle second converter (26) converts the power from the charging station to the traction battery pack, such as AC/DC conversion. The traction battery pack may thereby provide power to other parts of the electric vehicle assembly, as requested by the vehicle management unit (14). The traction battery pack may for example provide power to the vehicle electric arrangements (16), which may comprise a HVAC (18), an ePTO (19) for powering a number of vehicle high voltage unit (20), and a vehicle low voltage arrangement (17) comprising a vehicle system battery (22), for powering one or more vehicle electric systems (23); and a vehicle first converter (21), for converting power from the traction battery pack to the vehicle system battery.

Items

1. A power supply system for an electric vehicle and a cargo box, comprising:
   an electric vehicle assembly, for being located on the electric vehicle, comprising:
   a drivetrain;
   a number of vehicle electric arrangements, including a low voltage arrangement comprising:
   a vehicle system battery, for powering one or more vehicle electric systems; and
   a vehicle first converter, for converting power from the traction battery pack to the vehicle system battery; and
   a traction battery pack, for powering the electric arrangements and the drivetrain of the electric vehicle;
   a cargo box assembly, for being located on the cargo box, comprising:
   a number of cargo box electric arrangements, including a low voltage arrangement comprising:
   a cargo box system battery, for powering one or more cargo box electric systems; and
   a cargo box first converter, for converting power from the cargo box battery pack to the cargo box system battery;
   a cargo box battery pack, for powering the cargo box electric arrangements and the traction battery pack; and
   a cargo box second converter for converting power from a charging system, such as a charging station, to the cargo box battery pack.
2. The power supply system according to item 1, wherein the charging system is a charging station.
3. The power supply system according to any one of the preceding items, wherein the electric vehicle assembly further comprises a vehicle management unit, for acquiring one or more states of parts of the electric vehicle assembly.
4. The power supply system according to any one of the preceding items, wherein the cargo box assembly further comprises a cargo box management unit, for acquiring one or more states of parts of the cargo box assembly.
5. The power supply system according to any one of the preceding items, wherein the power supply system is configured for selectively switching between a number of modes, said modes comprising:
   a cargo box charging mode, wherein power is supplied from the charging system or charging station to the cargo box battery pack;

an assembled drive mode, wherein power is supplied from the cargo box battery pack to the traction battery pack; and a separated drive mode, wherein the electric vehicle assembly and the cargo box assembly is not electrically connected and power is transmitted between the traction battery pack and the drivetrain.

6. The power supply system according to item 5, wherein the modes further comprise an electric vehicle charging mode, wherein power is supplied from the charging system or charging station to the traction battery pack, and wherein the power supply system further comprises a vehicle second converter, for converting power from the charging system or charging station to the traction battery pack.

7. The power supply system according to any one of items 5-6, wherein the modes further comprise an electric vehicle charging mode, wherein power is supplied from the charging system/station to the traction battery pack, and wherein the power supply system further comprises a vehicle second converter, for converting power from the charging system/station to the traction battery pack, and from the traction battery pack to the cargo box battery pack.

8. The power supply system according to any one of items 5-7, wherein the modes further comprise an assembled charging mode, wherein power is received by the power supply system from the charging system or charging station, and sequentially supplied to the cargo box battery pack and the traction battery pack, such as sequentially supplied until fully charged.

9. The power supply system according to any one of items 5-8, wherein, in the cargo box charging mode, the separated drive mode, the assembled charging mode, and/or the assembled drive mode, power is supplied from the cargo box battery pack to the cargo box electric arrangements.

10. The power supply system according to any one of items 5-9, wherein, in the cargo box charging mode, the separated drive mode, the assembled charging mode, and/or the assembled drive mode, power is supplied from the traction battery pack to the vehicle electric arrangements.

11. The power supply system according to any one of items 5-10, wherein, in the separated drive mode and/or the electric vehicle charging mode, power is supplied from the traction battery pack to the vehicle electric arrangements.

12. The power supply system according to any one of the preceding items, wherein the power supply system is configured to activate the cargo box charging mode, upon electrically connecting the cargo box second converter and the charging system, such as the charging station.

13. The power supply system according to any one of the preceding items, wherein the power supply system is configured to activate the assembled drive mode, upon electrically disconnecting the cargo box second converter from the charging system, such as the charging station; and/or upon electrically connecting the cargo box assembly and the electric vehicle assembly.

14. The power supply system according to any one of the preceding items, wherein the cargo box second converter comprises or consists of an AC/DC/DC converter, configured for switching between:

an AC/DC mode, when the power supply system is in cargo box charging mode or assembled charging mode, for power conversion between the charging system or charging station and, the cargo box battery pack or the traction battery pack; and a DC/DC mode, when the power supply system is in assembled drive mode, for power conversion between the cargo box battery pack and the traction battery pack.

15. The power supply system according to item 14, wherein, upon connecting the cargo box assembly to the charging system or charging station, the AC/DC mode of the AC/DC/DC converter is activated, such as by the cargo box management unit.

16. The power supply system according to any one of items 14-15, wherein, upon disconnecting the cargo box assembly from the charging system or charging station, and/or upon electrically connecting the cargo box assembly and the electric vehicle assembly, the DC/DC mode of the AC/DC/DC converter is activated, such as by the cargo box management unit.

17. The power supply system according to any one of items 1-13, wherein the cargo box second converter comprises:

an AC/DC converter, for power conversion between the charging system or charging station and the cargo box battery pack, preferably in the cargo box charging mode or the traction battery pack, preferably in the assembled charging mode; and a DC/DC converter, for power conversion between the cargo box assembly and the electric vehicle assembly, preferably in the assembled drive mode.

18. The power supply system according to any one of the preceding items wherein, the traction battery pack comprises a traction battery management unit and/or the cargo box battery pack comprises a cargo box battery management unit.

19. The power supply system according to any one of the preceding items wherein, the vehicle electric arrangements are electric arrangements that require a higher voltage than the voltage supplied by the electric vehicle system battery, when fully charged, such as an electric power takeout (ePTO), a HVAC unit (heat, ventilation and air conditioning), and a hydraulic system, for lifting the cargo box; and/or wherein, the cargo box electric arrangements are electric arrangements that require a higher voltage than the voltage supplied by the cargo box system battery, when fully charged, such as a refuse compactor or a refrigerator unit.

20. The power supply system according to any one of the preceding items wherein, when in cargo box charging mode, the cargo box management unit calculates a cargo box requested power (Pcs_to_cb), such as continuously calculates.

21. The power supply system according to item 20, wherein the cargo box requested power (Pcs_to_cb) is based on a cargo box battery pack charging power (Pch_cb) and a cargo box systems power need (Parr_cb), such as wherein the cargo box battery pack charging power and/or the cargo box systems power need is continuously measured and/or calculated.

22. The power supply system according to item 21, wherein the cargo box requested power (Pcs_to_cb) is the sum of the cargo box battery pack charging power (Pch_cb) and the cargo box systems power need (Parr_cb).

23. The power supply system according to any one of items 20-22, wherein the cargo box management unit continuously communicates the cargo box requested power (Pcs_to_cb), to the cargo box second converter.

24. The power supply system according to item 23, wherein the cargo box requested power is calculated and communicated in substantially real-time.

25. The power supply system according to any one of the preceding items wherein, when in electric vehicle charging mode, the vehicle management unit calculates an electric vehicle charging power (Pcs_to_ev), such as continuously calculates.

26. The power supply system according to item 25, wherein the vehicle management unit continuously communicates the electric vehicle charging power (Pcs_to_ev), to the vehicle second converter.

27. The power supply system according to any one of the preceding items wherein, when in assembled drive mode, the vehicle management unit obtains, such as from the traction battery management unit, or by measuring, a traction battery pack charging power (Pch_ev), for charging the traction battery pack.

28. The power supply system according to any one of the preceding items wherein, when in assembled drive mode, the vehicle management unit calculates an electric vehicle requested power (Pcb_to_ev).

29. The power supply system according to item 28, wherein the electric vehicle requested power (Pcb_to_ev) is based on the traction battery pack charging power (Pch_ev), a vehicle electric arrangements power need (Parr_ev) and a momentarily electric vehicle power required for propelling the vehicle (Pdrive).

30. The power supply system according to any one of items 28-29, wherein the electric vehicle requested power (Pcb_to_ev) is the sum of the traction battery pack charging power (Pch_ev), the vehicle electric arrangements power need (Parr_ev), and the power required for propelling the vehicle (Pdrive), such as the momentary power for propelling the vehicle.

31. The power supply system according to any one of items 28-30, wherein the vehicle management unit communicates, preferably continuously, the electric vehicle requested power (Pcb_to_ev), to the cargo box management unit and/or the cargo box first converter.

32. The power supply system according to item 31, wherein the electric vehicle requested power is calculated and communicated in substantially real-time.

33. The power supply system according to any one of the preceding items, wherein the cargo box electric systems comprises any of sensors, actuators, intelligent entry system, GPS, lighting, surveillance, cooling, heating and/or means for communication.

34. The power supply system according to any one of the preceding items, wherein the electric vehicle electric systems comprises any of a hydraulic system, for lifting the cargo box, AC, ventilation, heating, servo, lights, signals, GPS and/or means for communication.

35. The power supply system according to any one of the preceding items wherein, the electric vehicle assembly is configured for communication between the vehicle management unit and any of: the vehicle electric arrangements, the drivetrain, the traction battery management unit, the traction battery pack, the charging system or charging station, and/or the electric vehicle secondary converter, such as by a data bus and/or wireless communication.

36. The power supply system according to any one of the preceding items wherein, the cargo box assembly is configured for communication between the cargo box management unit and any of: the cargo box electric arrangements, the cargo box first converter, the cargo box low voltage arrangement, the cargo box battery management unit, the cargo box battery pack, the charging system or charging station, and/or the cargo box secondary converter, such as by a data bus and/or wireless communication.

37. The power supply system according to any one of the preceding items, wherein the power supply system is configured for communication between the vehicle management unit and the cargo box management unit, such as by a data bus and/or wireless communication.

38. The power supply system according to any one of the preceding items, wherein the electrical connection between the electric vehicle assembly and the cargo box assembly is formed between two DC connectors, such as IEC 62196-3 Type 1 DC connector, IEC 62196-3 Type 2 DC connector or GB Part 3 DC connector, or wherein said connection is formed between two combined AC/DC charging connectors, such as IEC 62196-3 Type 1 AC/DC connectors or IEC 62196-3 Type 2 AC/DC connectors.

39. The power supply system according to any one of the preceding items, wherein the electrical connection between the charging system or charging station and the cargo box or the electric vehicle is formed between two AC connectors, such as IEC 62196-2 Type 1 AC connector, IEC 62196-2 Type 2 AC connector or GB Part 2 AC connector, or wherein said connection is formed between two combined AC/DC charging connectors, such as IEC 62196-3 Type 1 AC/DC connectors or IEC 62196-3 Type 2 AC/DC connectors.

40. A cargo transport vehicle assembly, comprising a cargo box and an electric vehicle for transporting the cargo box, wherein said cargo box comprises a cargo box assembly, and said electric vehicle comprises an electric vehicle assembly, according to any one of items 41. An electric vehicle for transporting a cargo box, comprising:
   a drivetrain;
   a number of vehicle electric arrangements, including a low voltage arrangement comprising:
      a vehicle system battery, for powering one or more vehicle electric systems; and
      a vehicle first converter, for converting power from the traction battery pack to the vehicle system battery;
   a traction battery pack, for powering the electric arrangements and the drivetrain; and
   a vehicle management unit, for acquiring one or more states of, and for controlling, parts of the electric vehicle assembly.

42. A cargo box for an electric vehicle, comprising:
   a number of cargo box electric arrangements, including a low voltage arrangement comprising:
      a cargo box system battery, for powering one or more cargo box electric systems; and
      a cargo box first converter, for converting power from the cargo box battery pack to the cargo box system battery;
   a cargo box battery pack, for powering the cargo box electric arrangements and a traction battery pack;
   a cargo box second converter, for converting power from a charging system or charging station to the cargo box battery pack; and
   a cargo box management unit, for acquiring one or more states of, and for controlling, parts of the electric vehicle assembly, and for communicating with the vehicle management unit.

The invention claimed is:

1. A power supply system for an electric vehicle and a cargo box, comprising:
  an electric vehicle assembly, for being located on the electric vehicle, comprising:
  a drivetrain;
  a traction battery pack;
  a number of vehicle electric arrangements, including a low voltage arrangement comprising:
    a vehicle system battery, for powering one or more vehicle electric systems; and
    a vehicle first converter, for converting power from the traction battery pack to the vehicle system battery;
  wherein the traction battery pack is configured to power the electric arrangements and the drivetrain of the electric vehicle; and
  a cargo box assembly, for being located on the cargo box, comprising:
    a cargo box battery pack;
    a number of cargo box electric arrangements, including a low voltage arrangement comprising:
      a cargo box system battery, for powering one or more cargo box electric systems; and
      a cargo box first converter, for converting power from the cargo box battery pack to the cargo box system battery; and
    wherein the cargo box battery pack is configured to power the cargo box electric arrangements and the traction battery pack; and
    a cargo box second converter, comprising an AC/DC converter and a DC/DC converter, for converting power from a charging system to the cargo box battery pack, and from the cargo box battery pack to the traction battery pack,
    wherein the vehicle electric arrangements are electric arrangements that require a higher voltage than the voltage supplied by the electric vehicle system battery; and/or
    wherein the cargo box electric arrangements are electric arrangements that require a higher voltage than the voltage supplied by the cargo box system battery, when fully charged.

2. The power supply system according to claim 1, wherein the charging system is a charging station.

3. The power supply system according to claim 1, wherein:
  the electric vehicle assembly further comprises a vehicle management unit, for acquiring one or more states of parts of the electric vehicle assembly;
  the cargo box assembly further comprises a cargo box management unit, for acquiring one or more states of parts of the cargo box assembly; and
  the power supply system is configured for communication between the vehicle management unit and the cargo box management unit.

4. The power supply system according to claim 1, wherein the power supply system is configured for selectively switching between a number of modes, said modes comprising:
  a cargo box charging mode, wherein power is supplied from the charging system to the cargo box battery pack;
  an assembled drive mode, wherein power is supplied from the cargo box battery pack to the traction battery pack; and a separated drive mode, wherein the electric vehicle assembly and the cargo box assembly is not electrically connected and power is transmitted between the traction battery pack and the drivetrain.

5. The power supply system according to claim 4, wherein the modes further comprise an assembled charging mode, wherein the power supply system is configured to:
  receive power from the charging system;
  supply power to the cargo box battery pack until full, and thereafter supply power to the traction battery pack.

6. The power supply system according to claim 4, wherein:
  the modes further comprise an electric vehicle charging mode;
  power is supplied from the charging system to the traction battery pack; and
  the power supply system further comprises a vehicle second converter, for converting power from the charging system to the traction battery pack, and from the traction battery pack to the cargo box battery pack.

7. The power supply system according to claim 5, wherein, in the cargo box charging mode, the separated drive mode, the assembled charging mode, and/or the assembled drive mode, the power supply system is configured to supply power from the cargo box battery pack to the cargo box electric arrangements.

8. The power supply system according to claim 4, wherein the power supply system is configured to activate the cargo box charging mode, upon electrically connecting the cargo box second converter and the charging system.

9. The power supply system according to claim 1, wherein:
  power is supplied from the cargo box battery pack to the cargo box electric arrangements; and/or
  power is supplied from the traction battery pack to the vehicle electric arrangements.

10. The power supply system according to claim 4, wherein:
  the power supply system is configured to activate the assembled drive mode;
    upon electrically disconnecting the cargo box second converter from the charging system; and/or
    upon electrically connecting the cargo box assembly and the electric vehicle assembly.

11. The power supply system according to claim 4, wherein:
  the power supply system is configured to activate the cargo box charging mode, or the assembled charging mode, upon electrically connecting the cargo box second converter and the charging system; and/or
  the power supply system is configured to activate the assembled drive mode;
    upon electrically disconnecting the cargo box second converter from the charging system; and/or
    upon electrically connecting the cargo box assembly and the electric vehicle assembly.

12. The power supply system according to claim 4, wherein, when the power supply system is in cargo box charging mode, the cargo box management unit calculates a cargo box requested power (Pcs_to_cb).

13. The power supply system according to claim 1, wherein a cargo box requested power (Pcs_to_cb) is the sum of a cargo box battery pack charging power (Pch_cb) and a cargo box electric arrangements power need (Parr_cb) and wherein the cargo box management unit continuously communicates the cargo box requested power (Pcs_to_cb), to the cargo box second converter.

14. The power supply system according to claim 1, wherein, when in electric vehicle charging mode, the vehicle management unit continuously calculates an electric vehicle charging power (Pcs_to_ev) and continuously communicates the electric vehicle charging power (Pcs_to_ev), to the vehicle second converter.

15. The power supply system according to claim 4, wherein, when in assembled drive mode, the vehicle management unit continuously calculates an electric vehicle requested power (Pcb_to_ev), which is the sum of a traction battery pack charging power (Pch_ev), a vehicle electric arrangements power need (Parr_ev), and a power required for propelling the vehicle (Pdrive), and wherein the vehicle management unit continuously communicates, the electric vehicle requested power (Pcb_to_ev), to the cargo box management unit and/or the cargo box second converter.

16. The power supply system according to claim 1, wherein:
- an electrical connection between the electric vehicle assembly and the cargo box assembly is formed between two DC connectors; and
- an electrical connection between the charging system and the cargo box or the electric vehicle is formed between two AC connectors.

17. A cargo transport vehicle assembly, comprising a cargo box and an electric vehicle for transporting the cargo box, wherein said cargo box comprises a cargo box assembly, and said electric vehicle comprises an electric vehicle assembly according to claim 1.

18. A cargo box for an electric vehicle, comprising:
- a cargo box battery pack;
- a number of cargo box electric arrangements, including a low voltage arrangement comprising:
  - a cargo box system battery, for powering one or more cargo box electric systems; and
  - a cargo box first converter, for converting power from the cargo box battery pack to the cargo box system battery;
- wherein the cargo box battery pack is configured to power the cargo box electric arrangements and a traction battery pack;
- a cargo box second converter, for converting power from a charging system to the cargo box battery pack; and
- a cargo box management unit, for acquiring one or more states of, and for controlling, parts of the electric vehicle assembly, and for communicating with a vehicle management unit;
- wherein a cargo box requested power (Pcs_to_cb) is the sum of a cargo box battery pack charging power (Pch_cb) and a cargo box electric arrangements power need (Parr_cb), and
- wherein the cargo box management unit continuously communicates the cargo box requested power (Pcs_to_cb), to the cargo box second converter.

19. A cargo box for an electric vehicle, comprising:
- a cargo box battery pack;
- a number of cargo box electric arrangements, including a low voltage arrangement comprising:
  - a cargo box system battery, for powering one or more cargo box electric systems; and
  - a cargo box first converter, for converting power from the cargo box battery pack to the cargo box system battery, wherein the cargo box battery pack is configured to power the cargo box electric arrangements and a traction battery pack;
- a cargo box second converter, for converting power from a charging system to the cargo box battery pack; and
- a cargo box management unit, for acquiring one or more states of, and for controlling, parts of the electric vehicle assembly, and for communicating with a vehicle management unit;
- wherein the cargo box electric arrangements are electric arrangements that require a higher voltage than the voltage supplied by the cargo box system battery, when fully charged.

20. A power supply system for an electric vehicle and a cargo box, comprising:
- an electric vehicle assembly, for being located on the electric vehicle, comprising:
- a drivetrain;
- a traction battery pack;
- a number of vehicle electric arrangements, including a low voltage arrangement comprising:
  - a vehicle system battery, for powering one or more vehicle electric systems; and
  - a vehicle first converter, for converting power from the traction battery pack to the vehicle system battery;
- wherein the traction battery pack is configured to power the electric arrangements and the drivetrain of the electric vehicle; and
- a cargo box assembly, for being located on the cargo box, comprising:
- a cargo box battery pack;
- a number of cargo box electric arrangements, including a low voltage arrangement comprising:
  - a cargo box system battery, for powering one or more cargo box electric systems; and
  - a cargo box first converter, for converting power from the cargo box battery pack to the cargo box system battery; and
- wherein the cargo box battery pack is configured to power the cargo box electric arrangements and the traction battery pack; and
- a cargo box second converter, comprising an AC/DC converter and a DC/DC converter, for converting power from a charging system to the cargo box battery pack, and from the cargo box battery pack to the traction battery pack;
- wherein the power supply system is configured for selectively switching between a number of modes, said modes comprising:
- a cargo box charging mode, wherein power is supplied from the charging system to the cargo box battery pack;
- an assembled drive mode, wherein power is supplied from the cargo box battery pack to the traction battery pack; and
- a separated drive mode, wherein the electric vehicle assembly and the cargo box assembly is not electrically connected and power is transmitted between the traction battery pack and the drivetrain;
- wherein, when the power supply system is in cargo box charging mode, the cargo box management unit calculates a cargo box requested power (Pcs_to_cb).

* * * * *